(12) United States Patent
Krueger et al.

(10) Patent No.: US 12,195,123 B2
(45) Date of Patent: Jan. 14, 2025

(54) SCREW CONNECTION BETWEEN STEERING COMPONENTS

(71) Applicant: Schaeffler Technologies AG & Co. KG, Herzogenaurach (DE)

(72) Inventors: Sebastian Krueger, Fürth (DE); Horst Münck, Herzogenaurach (DE); Christian Doerner, Sugenheim (DE); Philip Wurzberger, Aurachtal (DE); Rene Breitenstein, Herzogenaurach (DE)

(73) Assignee: Schaeffler Technologies AG &Co. KG, Herzogenaurach (DE)

( * ) Notice: Subject to any disclaimer, the term of this patent is extended or adjusted under 35 U.S.C. 154(b) by 0 days.

(21) Appl. No.: 18/543,473

(22) Filed: Dec. 18, 2023

(65) Prior Publication Data
US 2024/0199117 A1   Jun. 20, 2024

(30) Foreign Application Priority Data
Dec. 19, 2022   (DE) ................. 10 2022 133 910.6

(51) Int. Cl.
*B62D 7/16*   (2006.01)
*F16C 7/00*   (2006.01)

(52) U.S. Cl.
CPC ..................... *B62D 7/16* (2013.01)

(58) Field of Classification Search
CPC .............. B62D 7/16; B62D 7/163; F16C 7/00
See application file for complete search history.

(56) References Cited

U.S. PATENT DOCUMENTS

| | | | | |
|---|---|---|---|---|
| 3,467,421 A | * | 9/1969 | Bentley | F16F 1/387 267/279 |
| 3,725,981 A | * | 4/1973 | Pinckney | F16D 3/725 24/122.3 |
| 9,216,098 B2 | * | 12/2015 | Trudeau | A61F 2/4657 |
| 9,282,993 B1 | * | 3/2016 | Cohen | A61B 17/3421 |
| 2017/0113718 A1 | * | 4/2017 | Ohashi | F16F 1/3732 |
| 2020/0317262 A1 | * | 10/2020 | Sovern | F16H 19/04 |

FOREIGN PATENT DOCUMENTS

| | | |
|---|---|---|
| CN | 103644194 A | 3/2014 |
| DE | 20022385 U1 | 10/2001 |
| DE | 102012016666 A1 | 1/2013 |
| DE | 102011053334 A1 | 3/2013 |
| DE | 102015001926 A1 | 8/2016 |
| DE | 102016204568 A1 | 9/2017 |
| DE | 102018201428 A1 * | 3/2019 |
| DE | 102020125792 A1 | 4/2022 |

* cited by examiner

*Primary Examiner* — Jason D Shanske
*Assistant Examiner* — Daniel M. Keck

(57) ABSTRACT

A screw connection is formed between steering components, namely a push rod and a fork, in particular of a rear axle steering system. By means of a screw screwed coaxially into one of the two steering components and inserted through an opening in the other steering component, an annular disc-shaped end face of the one steering component is pressed against a likewise annular disc-shaped face of the other steering component. Furthermore, cylindrical mating faces contacting one another are formed by the steering components. In at least one of the two steering components, a transition region is formed between the annular disc-shaped face and the cylindrical mating face, which has at least two different radii of curvature.

20 Claims, 4 Drawing Sheets

SCREW CONNECTION BETWEEN STEERING COMPONENTS

CROSS-REFERENCE TO RELATED APPLICATIONS

This application claims priority under 35 U.S.C. Section 119 of German Patent Application No. DE 10 2022 133 910.6 filed on Dec. 19, 2022, the disclosure of which is incorporated herein by reference.

TECHNICAL FIELD

The disclosure relates to a screw connection formed between two steering components.

BACKGROUND

A generic screw connection is known, for example, from DE 10 2016 204 568 A1. This is a screw connection between a first component, which is designed as a fork piece for receiving a joint for a rear axle steering system of a motor vehicle, and a second component, which is a bearing or screw-on journal of an actuator of the rear axle steering system. The screw-on journal of the device according to DE 10 2016 204 568 A1 can be connected to a spindle of a spindle drive and guided in an axially sliding manner in an actuator housing. Each of the two interconnected components has a bearing face, wherein the bearing faces are braced against one another by a screw bolt. Furthermore, the components of the device according to DE 10 2016 204 568 A1 form cylindrical mating faces in the form of a cylindrical outer face and a cylindrical inner face.

DE 10 2014 225 644 A1 discloses a steering rod arrangement with a steering rod that is axially movably mounted and limited in terms of the steering stroke. The steering rod arrangement comprises a steering stroke limiting element arranged between a tie rod joint and a steering element functionally connected to the steering rod. The steering stroke limiting element serving as a stop can comprise an elastically deformable section. According to the teaching of DE 10 2014 225 644 A1, a pinion, thrust piece or ball screw nut is particularly suitable as a steering stroke limiting element. This is supposed to make it possible to additionally use existing steering elements designed to receive high forces for steering stroke limitation. Within the device according to DE 10 2014 225 644 A1, several annular disc-shaped stop faces are provided.

A screw connection in a steering system of a vehicle described in DE 10 2018 201 428 A1 comprises a screw component and a connecting component, wherein the screw component has a cylindrical support device that rests against a wall of the connecting component. In this regard, the cylindrical support device rests against a correspondingly designed cylindrical inner wall of the connecting component.

SUMMARY

The disclosure is based on the object of specifying a screw connection for chassis applications which has been further developed compared with the prior art and is characterized by a particularly favorable ratio between material and manufacturing costs on the one hand and stability on the other.

According to the disclosure, this object is achieved by a screw connection having the features described herein. The screw connection is suitable for use in a steering system of a motor vehicle.

The screw connection comprises two steering components, namely a push rod and a fork. By means of a screw screwed coaxially into one of the two steering components and inserted through an opening in the other steering component, an annular disc-shaped end face of the one steering component is pressed against a likewise annular disc-shaped face of the other steering component. Cylindrical mating faces contacting one another are formed by the steering components. In at least one of the two steering components, a transition region is formed between the annular disc-shaped face and the cylindrical mating face, which has at least two different radii of curvature.

The disclosure is based on the consideration that stress peaks can be reduced by rounding edges, even in parts of screw connections. In addition, such rounding can prevent a sharp-edged contour of a first component from being pressed into a contour of a second component during assembly. Generously dimensioned rounding, i.e., large radii of curvature, is therefore generally to be welcomed.

On the other hand, rounding with large radii can lead to a reduction in the functional faces that must be present in the elements to be connected to one another by a screw connection and serve to transmit forces or also moments, which can reduce the load capacity and service life of the screw connection and/or require greater dimensioning of the entire screw connection.

This conflict of objectives is effectively countered in the screw connection according to the application by the special rounding in the transition region between the annular disc-shaped face and the cylindrical mating face, which does not have a uniform radius of curvature. In particular, a transition region of the type described herein can be formed in each of the two steering components.

According to a first group of possible embodiments, a finite number of different radii of curvature exists in the transition region. In particular, the curved sections can have three or more different radii of curvature, wherein the curved sections of differing degrees of curvature, which each have a radius of curvature that is uniform within the section in question, adjoin one another without kinks and—in the case of the two outermost sections—adjoin the planar annular disc-shaped face or the cylindrical mating face, respectively. This also applies to modified variants in which conical faces are formed instead of planar annular disc-shaped faces.

According to a second group of possible embodiments, the radius of curvature changes continuously within the transition region. Here, the transition region can be profiled in an elliptical, not circular, manner. Alternatively, the transition region describes a Gothic arch profile. Variants are also possible in which the transition region is formed as a bionic profile. As far as design possibilities of bionic profiles are concerned, reference is made by way of example to publication DE 10 2012 016 666 A1.

Regardless of whether the radius of curvature within the transition region changes in steps or continuously, according to a wide variety of possible embodiments, the maximum radius of curvature of the transition region is formed adjacent to the annular disc-shaped face and the minimum radius of curvature of the transition region is formed adjacent to the cylindrical mating face. This makes it possible to achieve a particularly short design of the screw connection with generously dimensioned flat or cylindrical mating faces. In particular, the maximum radius of curvature in the transition region is at least half the diameter of the cylindrical mating faces and the minimum radius of curvature is at most one tenth of the diameter of the same mating faces.

BRIEF DESCRIPTION OF THE DRAWINGS

In the following, several exemplary embodiments of the disclosure as well as a comparative example are explained in more detail with reference to a drawing. In the drawings, partly simplified.

DETAILED DESCRIPTION

Unless otherwise stated, the following explanations relate to all exemplary embodiments. Parts or contours that correspond to each other or have basically the same effect are marked with the same reference symbols in all figures. This also applies, insofar as the structure of the various devices is basically comparable with the exemplary embodiments.

Figure 1:
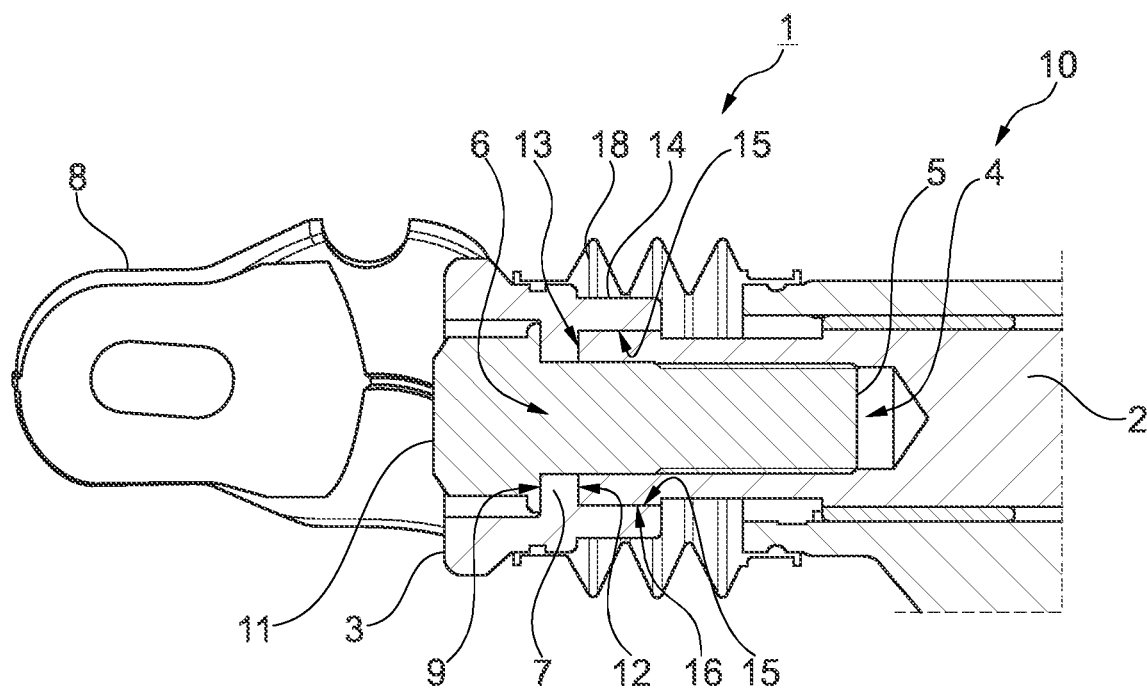
FIG. 1 shows a longitudinal cross-sectional view of a screw connection formed between steering components.

A screw connection 1 is formed within a rear axle steering system 10 of a motor vehicle between a push rod 2 and a fork 3. In the exemplary embodiments, the push rod is electro-mechanically actuated. The fork 3 is intended for articulated connection to a tie rod (not shown). The end of the push rod 2 visible in FIG. 1 is designed as a screw bolt, wherein the push rod 2 can be designed as a single part or multiple parts. At its end facing the fork 3, the push rod 2 has a threaded hole 4 into which a screw 5 is screwed. The screw 5 is inserted through an opening 6 in a base 7 of the fork 3. On its inner side facing two parallel fork arms 8, the base 7 has an inner planar face 9 against which the screw head of the screw 5, designated with 11, rests. Mirror-inverted to the inner planar face 9, an annular disc-shaped face 12 is formed on the outer side of the base 7, which contacts a likewise annular disc-shaped face 13 of the push rod 2, i.e., a further planar face.

Figure 2:
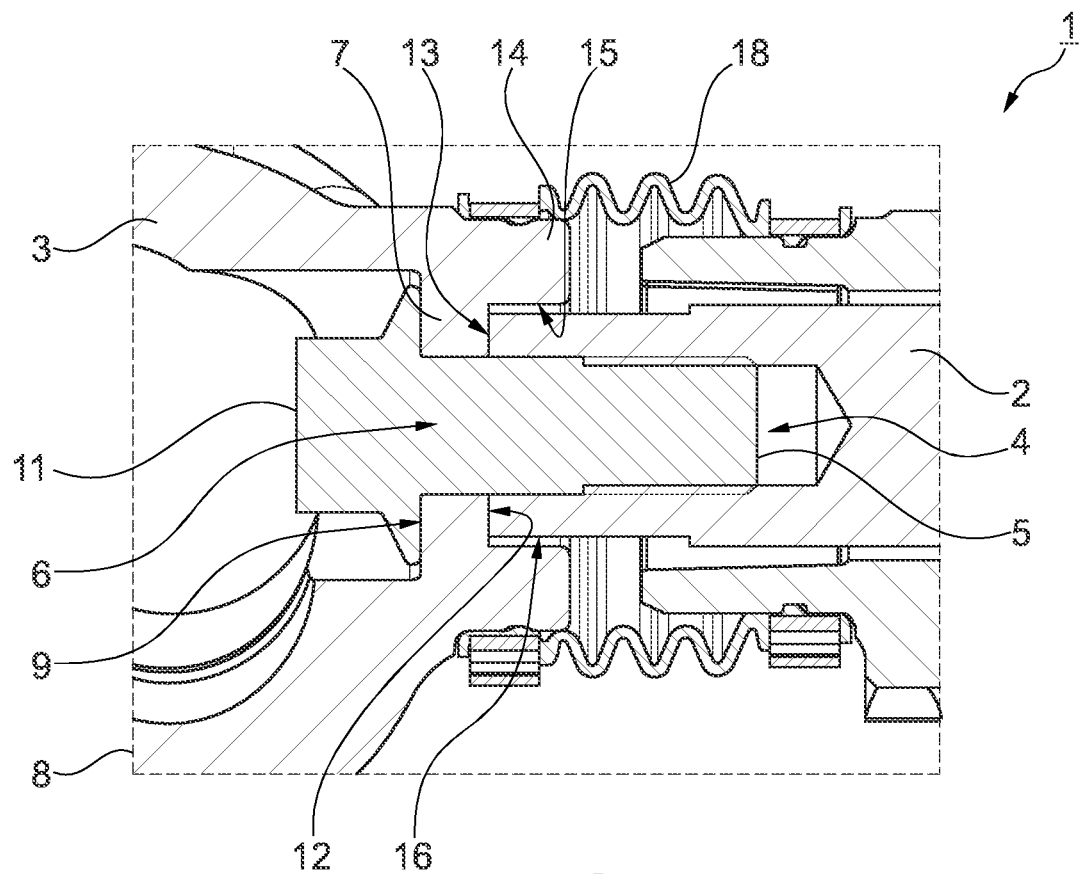
FIG. 2 shows a comparative example which also has a screw connection.

The fork 3 continues beyond the base 7 in the axial direction towards the push rod 2 in the form of a sleeve-shaped extension 14. The cylindrical inner circumferential face of the sleeve-shaped extension 14, designated with 15, is a mating face for centering purposes, which contacts a cylindrical outer circumferential face 16 of the push rod 2 as a further mating face. The section of the push rod 2 inserted into the sleeve-shaped extension 14 and having the mating faces 13, 16 is designated as the mating section 17. A comparison between FIGS. 1 and 2 shows that a corresponding guidance of the push rod 2 in the fork 3 is not provided in FIG. 2. A bellows provided for sealing is designated with 18 in both cases.

Figure 3:
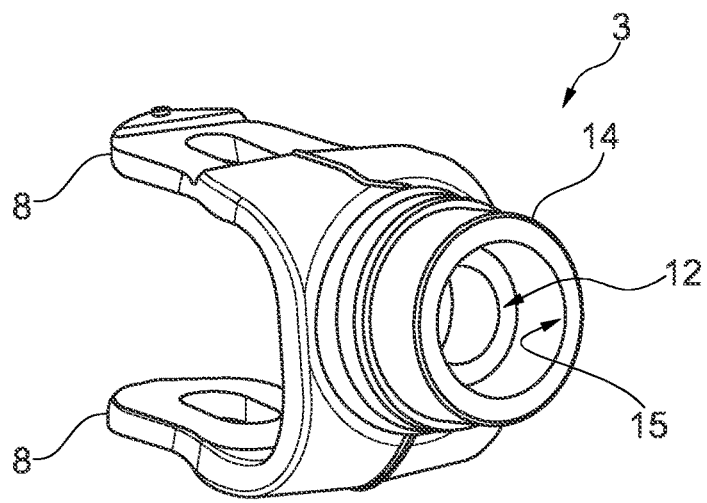
FIG. 3 shows a perspective view of a fork of the screw connection according to FIG. 1.
Figure 4:
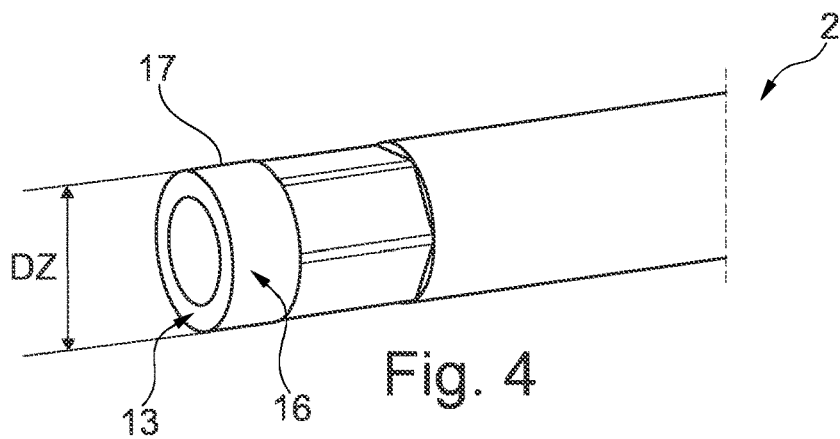
FIG. 4 shows a push rod of the screw connection according to FIG. 1.

The screw connection 1 is not only designed to receive axial forces between the steering components 2, 3, i.e., the push rod 2 and the fork 3, but is also capable of receiving lateral forces and tilting moments. Here, the number of parts is not increased in relation to the comparative example according to FIG. 1. Geometric details of the fork 3 and the push rod 2 can also be seen in FIGS. 3 and 4. The diameter of the cylindrical mating faces 15, 16 corresponding to the outer diameter of the push rod 2 and the inner diameter of the sleeve-shaped extension 14 is designated with DZ.

Figure 5:
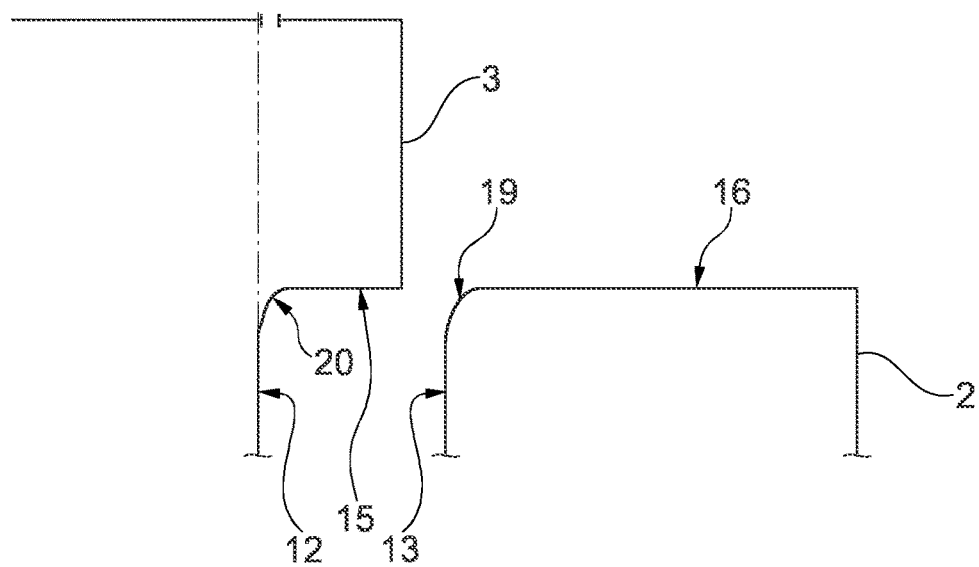
FIG. 5 shows contours of the fork and push rod provided for mutual contact.

With regard to the principal interaction between the various faces 12, 13, 15, 16 of the steering components 2, 3, reference is made to FIG. 5. This figure shows that a curved transition region 19 is formed on the push rod 2 between the annular disc-shaped face 13 and the cylindrical outer circumferential face 16. Similarly, a transition region 20 exists on the fork 3 between the annular disc-shaped face 12 and the cylindrical inner circumferential face 15. The transition regions 19, 20 perform multiple functions: Firstly, the curved transition regions 19, 20 facilitate the assembly and centering of the steering components 2, 3. The curvature of the regions 19, 20 contributes to the avoidance of stress peaks. At the same time, generously dimensioned planar or cylindrical faces 12, 13, 15, 16 remain available for transmitting forces and moments between the steering components 2, 3.

Each transition region 19, 20 comprises curved sections 21, 22 of differing degrees of curvature. FIGS. 6 to 11 outline different possible variants of the contouring of the transition region 19 of the push rod 2. In a corresponding manner, the transition region 20 of the fork 3 is also contoured in all of these variants. The transition region 19 can be composed of a discrete number of curved sections 21, 22, each having a constant radius of curvature within themselves. This applies to the exemplary embodiments according to FIGS. 6 to 8. Alternatively, as outlined in FIGS. 9 to 11, the radius of curvature can change continuously from the annular disc-shaped face 13 to the cylindrical face 16. In all cases, the radius of curvature of the transition region 19 is maximum in a section 21 adjacent to the annular disc-shaped face 13 and minimum in a section 22 adjacent to the cylindrical mating face 16.

Figure 6:
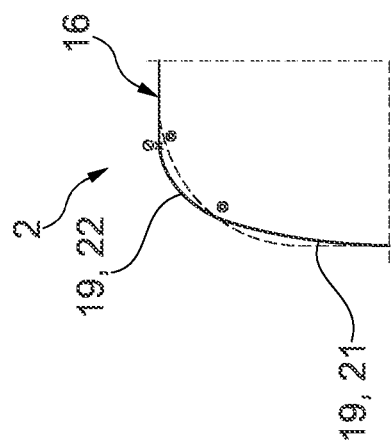
FIGS. 6 to 11 show various profiling variants of screw connections.

In FIG. 6, the contouring of transition region 19 is shown dashed and contrasted with a contouring variant drawn with a solid line. As shown in FIG. 6, the dashed transition region 19 has a much larger radius of curvature over a wide region than the comparative contour drawn with a solid line. Only in the section 22 of the transition region 19 adjoining the cylindrical section 16 is the radius of curvature of the transition region 19 significantly smaller than in the geometrically simpler comparative contour. In particular, this achieves a wide expansion of the cylindrical outer circumferential face 16 in the direction of the annular disc-shaped face 12 of the fork 3 (not shown here).

Figure 7:
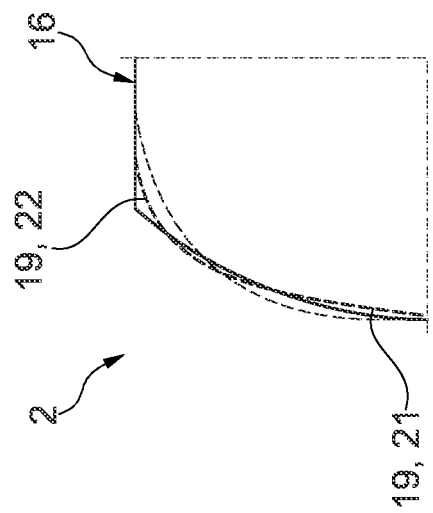

In the outline according to FIG. 7, a first conventional comparative contour is drawn with a thin dashed line. A second, hypothetical comparative contour is drawn with a solid line. The hypothetical comparative contour is characterized by a particularly large radius of curvature. Although this results in a large axial expansion of the cylindrical region of the push rod 2, i.e., the cylindrical outer circumferential face 16, it also results in a sharp edge between the curved region and the cylindrical outer circumferential face 16. The contour of the transition region 19 drawn with a thick dashed line represents, as shown in FIG. 7, a compromise between the two comparative contours. Firstly, the cylindrical region, i.e., the outer circumferential face 16, is not unnecessarily shortened, and secondly, sharp-edged transitions are avoided.

Figure 8:
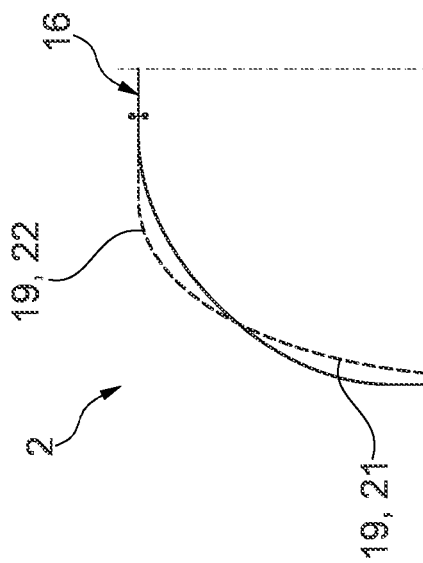

In the exemplary embodiment according to FIG. 8, a possible variant of the transition region 19 is shown with a solid line, whereas a comparative variant is shown with a dashed line. This figure also shows that the radius of curvature of the transition region 19, which narrows towards the cylindrical outer circumferential face 16, contributes significantly to a greater expansion of the cylindrical section serving for centering and also receiving bending loads, i.e., the outer circumferential face 16.

Figure 9:
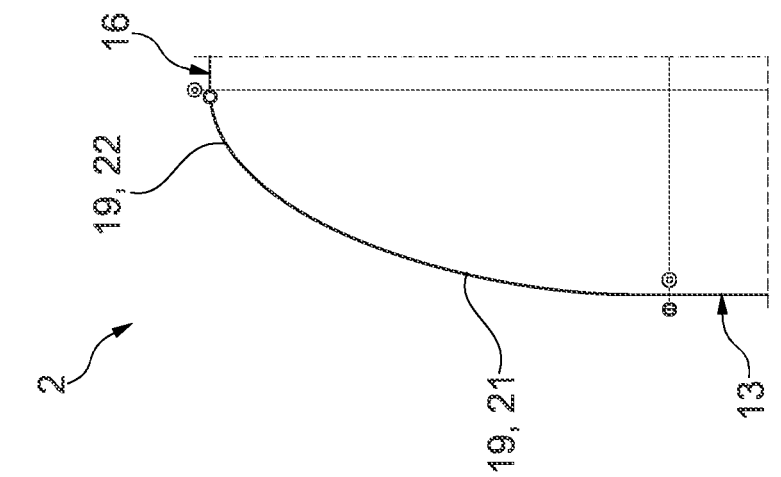

In the case of FIG. 9, the transition region 19 is profiled in an elliptical, not circular, manner. In this regard, the short half-axis of the ellipse described by the transition region 19 is aligned in the axial direction and the long half-axis of the ellipse is aligned in the radial direction of the push rod 2.

Figure 11:
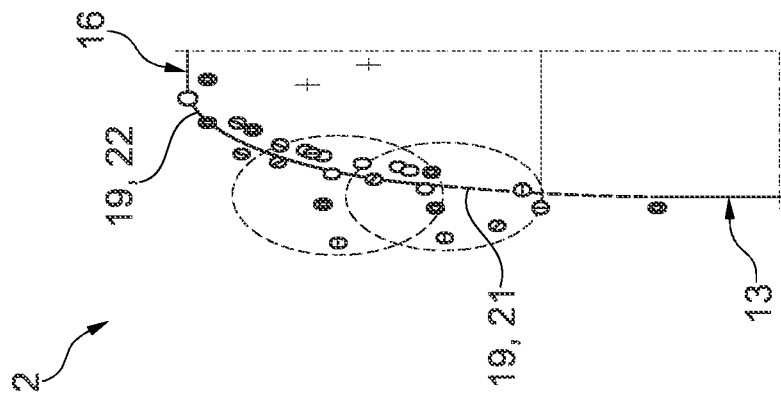
Figure 10:
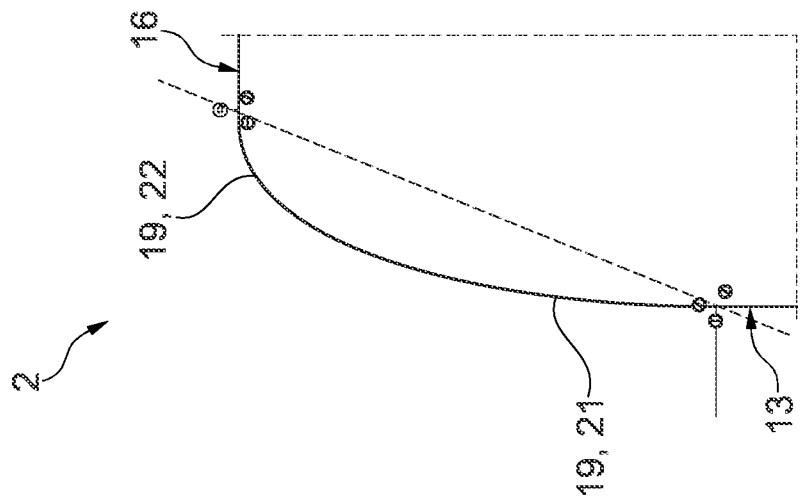

The variants according to FIGS. 10 and 11 are variations of the profiling of the transition region 19 according to FIG. 9. In this regard, the variant according to FIG. 10 features a Gothic arch profile and the variant according to FIG. 11 features a bionic profile of the transition region 19. In all cases, the transition region 19 adjoins the faces 12, 16 without edges.

LIST OF REFERENCE SYMBOLS

1 Screw connection
2 Push rod
3 Fork
4 Threaded hole
5 Screw
6 Opening
7 Base
8 Fork arm
9 Inner planar face
10 Rear axle steering system
11 Screw head
12 Annular disc-shaped face of the fork
13 Annular disc-shaped face of the push rod
14 Sleeve-shaped extension of the fork
15 Cylindrical inner circumferential face of the fork
16 Cylindrical outer circumferential face of the push rod
17 Mating section
18 Bellows
19 Transition region on the push rod
20 Transition region on the fork
21 Curved section with large radius of curvature
22 Curved section with smaller radius of curvature
DZ Diameter

What is claimed is:

1. A screw connection between steering components, comprising: a push rod, a fork, and a screw secured coaxially into one of the push rod or the fork and inserted through an opening of a remaining one of the push rod or the fork, an annular disc-shaped end face of the one of the push rod or fork is pressed against an annular disc-shaped face of the remaining one of the push rod or the fork, and the push rod and the fork form two cylindrical mating faces configured to contact one another, and within at least one of the push rod or the fork, a first transition region is formed between the annular disc-shaped face or the annular disc-shaped end face and one of the two cylindrical mating faces, the first transition region having at least two different radii of curvature.

2. The screw connection according to claim 1, further comprising a second transition region having at least two different radii of curvature, and the first transition region is formed in the push rod, and the second transition region is formed in the fork.

3. The screw connection according to claim 1, wherein the first transition region defines a finite number of different radii of curvature.

4. The screw connection according to claim 1, wherein the first transition region defines a continuum of changing radii of curvature.

5. The screw connection according to claim 4, wherein the first transition region defines an elliptical profile, and not a circular profile.

6. The screw connection according to claim 4, wherein the first transition region defines a Gothic arch profile.

7. The screw connection according to claim 4, wherein the first transition region defines a bionic profile.

8. The screw connection according to claim 1, wherein a maximum radius of curvature of the first transition region is formed adjacent to the annular disc-shaped face or the annular disc-shaped end face and a minimum radius of curvature of the first transition region is formed adjacent to the one of the two cylindrical mating faces.

9. The screw connection according to claim 8, wherein a maximum radius of curvature section of the first transition region is at least half of a diameter of the two cylindrical mating faces, and a minimum radius of curvature section of the first transition region is less than or equal to one tenth of the diameter of the two cylindrical mating faces.

10. A steering system of a motor vehicle, comprising a screw connection according to claim 1.

11. A screw connection between steering components, comprising:
a push rod having a threaded hole,
a fork having:
two parallel extending arms configured as an articulated connection, and
a base configured to abut with the push rod,
a screw:
engaged with a first axial face of the base, and
disposed within the threaded hole so as to secure the fork to the push rod via pressing of a second axial face of the base against a third axial face of the push rod, and
a curved transition region extending from at least one of:
the second axial face to a cylindrical inner circumferential face of the fork, or
the third axial face to a cylindrical outer circumferential face of the push rod, and
the curved transition region having at least two different radii of curvature.

12. The screw connection according to claim 11, wherein the cylindrical inner circumferential face of the fork contacts the cylindrical outer circumferential face of the push rod.

13. The screw connection according to claim 11, further comprising:
a first curved transition region extending from the second axial face to the cylindrical inner circumferential face of the fork, and
a second curved transition region extending from the third axial face to the cylindrical outer circumferential face of the push rod, and
the first curved transition region and the second curved transition region each having at least two different radii of curvature.

14. The screw connection according to claim 11, wherein the curved transition region defines a finite number of different radii of curvature.

15. The screw connection according to claim 11, wherein the curved transition region defines a continuum of changing radii of curvature.

16. The screw connection according to claim 11, wherein the curved transition region defines a gothic arch profile.

17. The screw connection according to claim 11, wherein a maximum radius of curvature of the curved transition region is formed adjacent to the second axial face and/or the first axial face, and a minimum radius of curvature of the curved transition region is formed adjacent to the cylindrical inner circumferential face and/or the cylindrical outer circumferential face.

18. The screw connection according to claim 11, wherein the screw extends through an opening of the base.

19. The screw connection according to claim 18, wherein the fork further comprises a sleeve-shaped extension extending from the base, and the push rod is disposed within the sleeve-shaped extension.

20. The screw connection according to claim 19, wherein the sleeve-shaped extension includes the cylindrical inner circumferential face.

\* \* \* \* \*